E. NIER.
METHOD OF PRODUCING HORNS FOR GRAMOPHONES AND THE LIKE.
APPLICATION FILED JAN. 3, 1912.

1,038,942.

Patented Sept. 17, 1912.

Witnesses:
James B. Mansfield
Jno. M. Alexander

Inventor
Ernst Nier
By: Alexander Dowell
Attorneys

COLUMBIA PLANOGRAPH CO., WASHINGTON, D. C.

UNITED STATES PATENT OFFICE.

ERNST NIER, OF BEIERFELD, GERMANY.

METHOD OF PRODUCING HORNS FOR GRAMOPHONES AND THE LIKE.

1,038,942.  Specification of Letters Patent.  Patented Sept. 17, 1912.

Application filed January 3, 1912. Serial No. 669,222.

*To all whom it may concern:*

Be it known that I, ERNST NIER, a subject of the German Emperor, residing at Beierfeld, in Saxony, Germany, have invented a certain new and useful Improvement in the Method of Producing Horns for Gramophones and the Like, of which the following is a specification.

The method heretofore adapted for the manufacture of trumpet-mouthed horns for gramophones, phonographs and the like, consists in joining together a plurality of suitably shaped pieces, by means of lap joints, rivets or the like. This method of manufacture has the disadvantage that the jointed pieces are capable of independent vibration, which deteriorates the purity of the sound. The process of tightening up one of the joints, by hammering or similar means, always tends to loosen the other joints, so that a certain amount of looseness of structure is inevitable.

The object of the present invention is to obviate this disadvantage, and the invention consists in the improved method of manufacture which will now be described with reference to the accompanying drawing.

Figure 1:
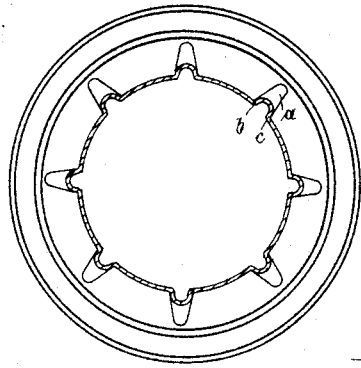
Figure 2:
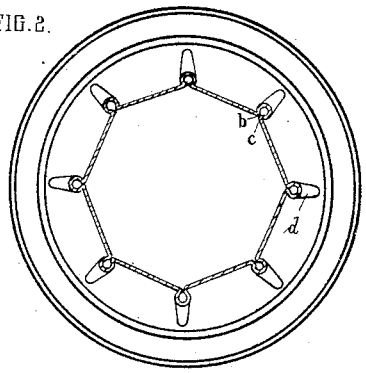
Figure 3:
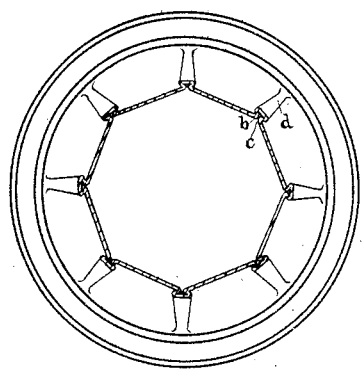
Figure 4:
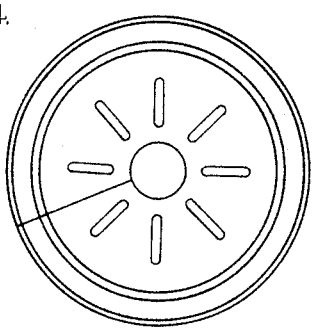

In the drawing, Figures 1, 2 and 3 are sectional views illustrating three successive stages of the manufacture of a horn. Fig. 4 is a rear elevation of a finished horn, and Fig. 5 is a longitudinal section of a finished horn, with dotted lines indicating the shape of the wall at successive stages of manufacture.

A suitably shaped strip of the material of which the horn is to be made is bent into the shape of a hollow truncated cone, and the contacting edges are joined together by means of a lap joint or the like. A very tight joint can be made in this case by hammering or other suitable treatment, and there are no other joints liable to be loosened by this treatment. The smooth sides of the hollow truncated cone formed in the manner described are indicated at $k^1$ in Fig. 5. The rim at the base of the cone may be bent and curled around in the usual manner, as shown in the drawing. The next step in the process of manufacture consists in making longitudinal indentations in the cone, that is to say indentations which extend in the direction of generators of the cone, as indicated at $a$ in Figs. 1 and 5. These indentations, which are preferably uniformly spaced apart, increase in depth from their ends toward their central parts, so that the conical body is constricted at the middle, and acquires the shape indicated by the dotted line $k^2$ in Fig. 5. The said indentations may be made inward instead of outward, as shown in the drawing. In order to increase the constriction referred to, the walls of the ribs formed by the indentations $a$ are bent together so that their lower edges $b$ and $c$ close together; by this means a series of tubular ribs $d$ is formed on the horn body. This bending together of the rib walls is not essential to the invention, but enables a considerable constriction to be obtained with a comparatively small number of ribs.

Figure 5:
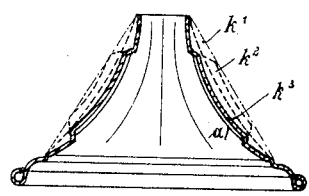

The ribs $d$ may be retained in tubular shape, or may be flattened out by hammering or pressing, as shown in Fig. 3, so that the horn acquires the final shape shown at $k^3$ in Fig. 5.

Instead of flattening the ribs $d$ symmetrically, as shown in the drawing, they may be bent over and flattened down sidewise, to the right or left of the joint made by the edges $b$ and $c$.

What I claim as my invention and desire to secure by Letters Patent of the United States is:—

1. The method of manufacturing a trumpet mouthed horn for a gramophone or the like by bending a sheet of metal to the shape of a hollow truncated cone, securing the side edges together and making longitudinal indentations in the sides of said cone, increasing in depth from each of their ends toward their central parts and curving the metal inward between the largest and smallest diameter of said cone.

2. The method of manufacturing a trumpet mouthed horn for a gramophone or the like by bending a sheet of metal to the shape of a hollow truncated cone, securing the side edges together and making longitudinal indentations in the sides of said cone, increasing in depth from each of their ends toward their central parts and curving the metal inward between the largest and smallest diameter of said cone, and bending together the walls of the several indentations, so that the indentations are converted into tubular ribs tapering to zero at each end.

3. The method of manufacturing a trumpet mouthed horn for a gramophone or the like by bending a sheet of metal to the shape of a hollow truncated cone, securing the side edges together and making longitudinal indentations in the sides of said cone, increasing in depth from each of their ends toward their central parts and curving the metal inward between the largest and smallest diameter of said cone, bending together the walls of the several indentations, so that the indentations are converted into tubular ribs tapering to zero at each end and flattening the said tubular ribs.

In witness whereof I have signed this specification in the presence of two witnesses.

ERNST NIER.

Witnesses:
OTTO SPRUYEL,
RUDOLPH FRICKE.

Copies of this patent may be obtained for five cents each, by addressing the "Commissioner of Patents, Washington, D. C."